(No Model.)
G. H. SPENCER.
BARREL TRUCK.
No. 328,076. Patented Oct. 13, 1885.
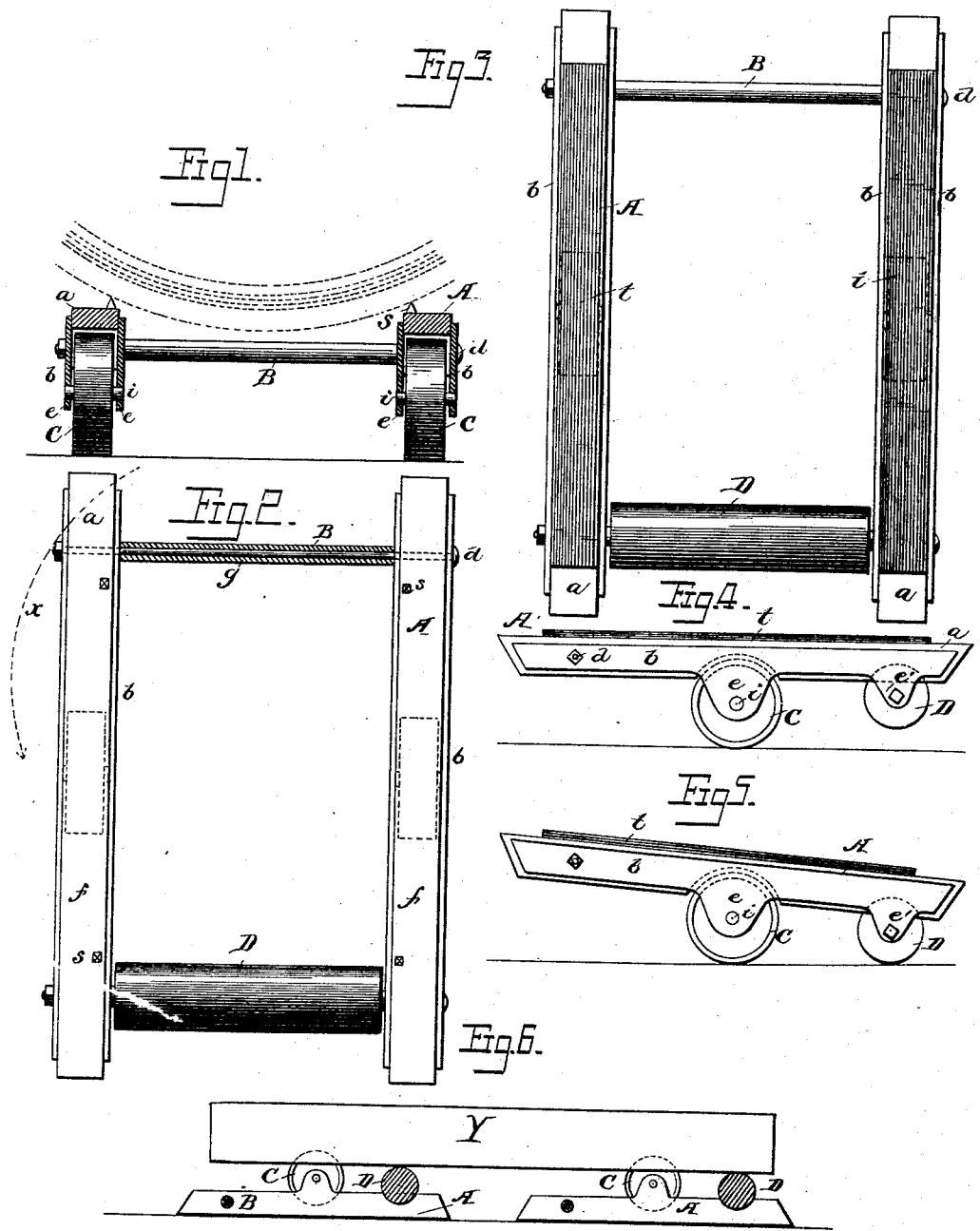

UNITED STATES PATENT OFFICE.

GEORGE H. SPENCER, OF CHICAGO, ILLINOIS.

BARREL-TRUCK.

SPECIFICATION forming part of Letters Patent No. 328,076, dated October 13, 1885.

Application filed December 15, 1884. Serial No. 150,449. (No model.)

*To all whom it may concern:*

Be it known that I, GEORGE H. SPENCER, a citizen of the United States, residing at Chicago, in the county of Cook and State of Illinois, have invented certain new and useful Improvements in Barrel-Rollers, of which the following is a specification.

My invention is a barrel-roller, constructed as fully described hereinafter, so as to facilitate the movement of barrels and other objects, and secure a strong, durable, and effective structure.

In the drawings, Figure 1 is a transverse section of a barrel-roller illustrating my improvement. Fig. 2 is a plan view; Fig. 3, a plan illustrating a modification; Figs. 4 and 5, side views of the modified form of roller illustrated in Fig. 3; Fig. 6, a view illustrating one mode of using the device; Fig. 7, a cross-section illustrating one mode of making the side pieces of the frame.

The frame A of the device consists of the side pieces, $a\ a$, and connecting-bars B B.

The side pieces, $a$, are provided with longitudinal metallic straps $b\ b$, extended at the center to form ears $e$, to support the shafts or journals $i$ of rollers C, the said straps being either applied to opposite sides of a wooden strip, $f$, or constituting the side pieces of a cast-metal strip of the cross-sectional form illustrated in Fig. 7.

The cross-bars consist each of a bolt, $d$, which entends through the side pieces, and a tube, $g$, which incloses that portion of the bolt between the sides pieces, and serves as a distance-piece, and bearing against which the side pieces are clamped when the nut of the bolt is turned, thereby forming a rigid frame or structure.

Each roller C, turning between the ears of the straps $b$, occupies a position about midway between the ends of the side piece, but does not project above the upper face thereof, which face is provided with studs $s$, or with a rubber strip, $t$, so that articles placed thereon will not readily move from their position.

The cross-bars B are arranged at some distance below the upper face of the frame, so that when a barrel is laid longitudinally upon the said frame it will take its bearings upon the side pieces and not upon the cross-bars, as shown in Fig. 1.

As the weight of the barrel, box, or other object comes directly upon the side pieces, and as the rollers are directly below the side pieces, there is less tendency to wrench the rollers from their bearings or to bend the axles or journals than results when the rollers turn upon shafts or journals projecting from the sides of the side pieces.

In order to facilitate the transportation of heavy objects, I prefer to use in connection with the parts above described, a roller, D, which is arranged to turn upon one of the cross-bars B, the latter in such case extending through ears $e'$, so that the upper surface of the roller D will be below the upper surface of the frame A, to permit the barrel or other object to rest upon the frame without contact with the roller. The diameter of the roller is such, however, that when the device is in a horizontal position, as shown in Fig. 4, the roller will be free from contact with the ground, and the device may be turned readily around the center $x$, Fig. 2, so as to move the object carried to any desired position; but by slightly tilting the frame the roller D may be brought upon the ground, upon which the device may then be drawn in a straight course.

By the use of the roller, I am also enabled to facilitate the movement of long narrow beams, boxes, or packages. Thus two or more of the devices may be inverted and placed in line, as shown in Fig. 6, and the beam or other object, Y, may be then placed upon the rollers D and readily moved longitudinally.

Without limiting myself to the precise construction and arrangement of parts shown and described, I claim—

1. The combination, in a barrel-roller, of side pieces, cross-pieces, and rollers arranged directly below the face of each side piece and about midway between the ends thereof, said side pieces being provided with straps $b\ b$, secured to the sides thereof and extended to form ears $e$, each roller turning in bearings in said ears between the side straps and below the upper face of the side pieces, substantially as set forth.

2. The combination of the frame A, consisting of side and cross pieces, supporting-rollers C C, and roller D, of uniform diameter throughout, extending entirely across the frame between the side pieces, substantially as set forth.

3. The combination of the frame A, supporting-rollers and retaining-strip t, of rubber or other similar elastic material, secured permanently to the upper face of the frame, substantially as set forth.

In testimony whereof I have signed my name to this specification in the presence of two subscribing witnesses.

GEORGE H. SPENCER.

Witnesses:
CHARLES E. FOSTER,
W. C. DUVALL.